March 12, 1940.  P. F. YUNGLING  2,193,752
STEERING MECHANISM FOR MOTOR VEHICLES
Filed July 19, 1937  2 Sheets-Sheet 1
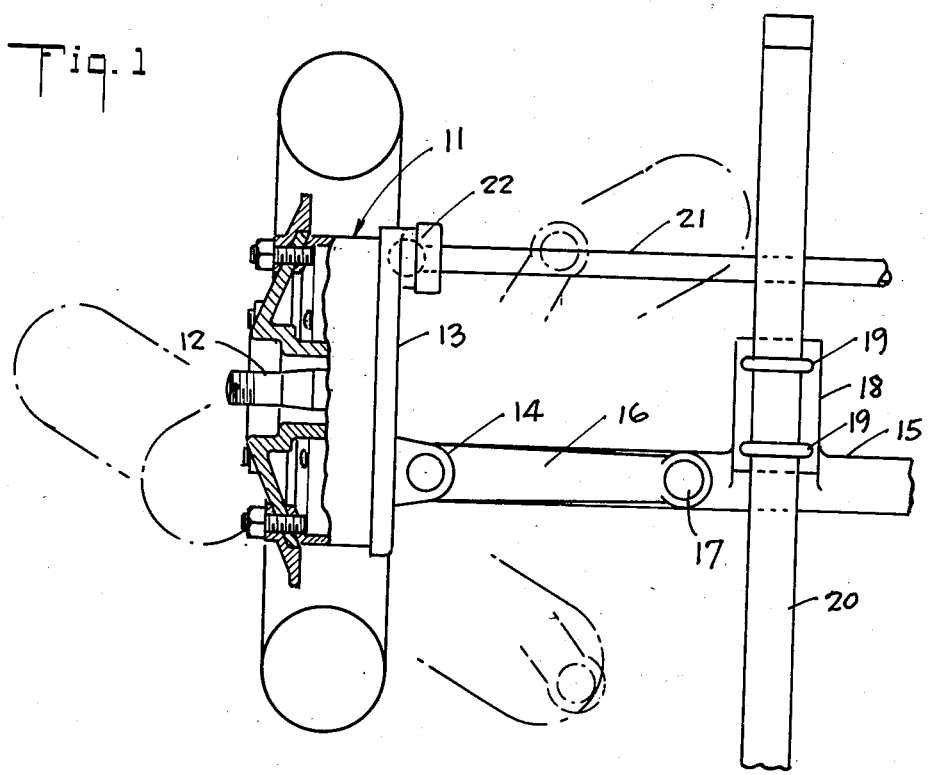
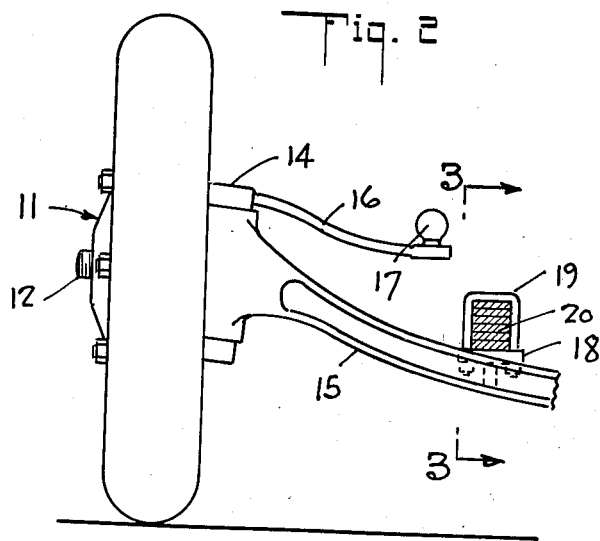
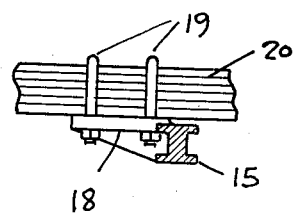
INVENTOR.
Paul F. Yungling
BY Joseph F. Westall
ATTORNEY.

March 12, 1940.  P. F. YUNGLING  2,193,752
STEERING MECHANISM FOR MOTOR VEHICLES
Filed July 19, 1937  2 Sheets-Sheet 2
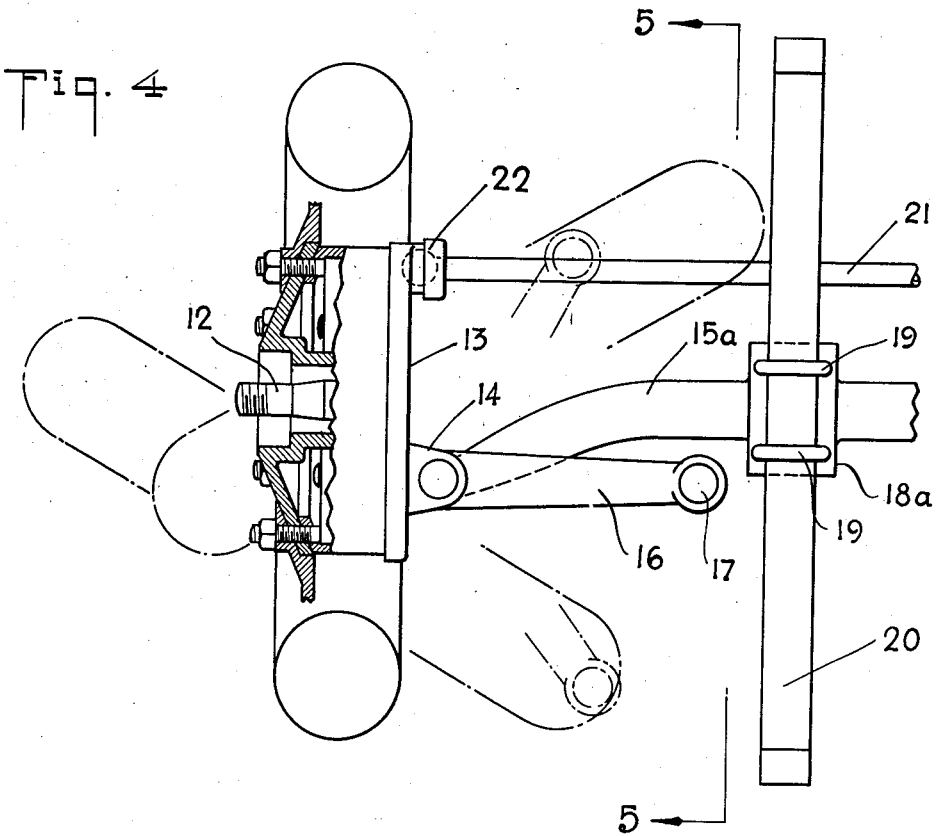
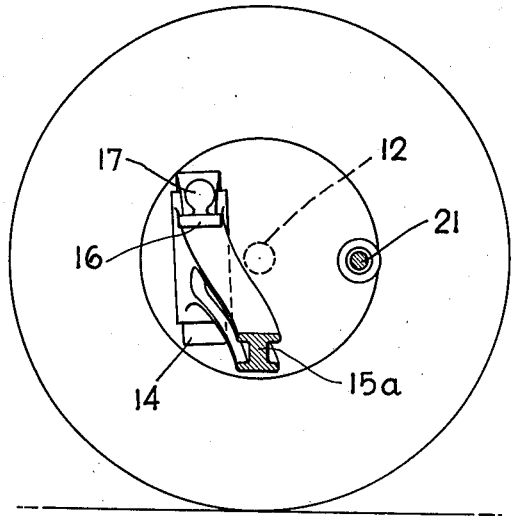
INVENTOR
Paul F. Yungling
BY Joseph F. Westall
ATTORNEY Patented Mar. 12, 1940

2,193,752

UNITED STATES PATENT OFFICE 2,193,752

STEERING MECHANISM FOR MOTOR VEHICLES

Paul F. Yungling, Los Angeles, Calif.

Application July 19, 1937, Serial No. 154,350

5 Claims. (Cl. 280—93)

This invention relates particularly to the point of connection of a steering knuckle to the wheel hub of such vehicle, so as to increase the range of lateral turning movement permissible.

It is a principal object of my said invention to facilitate parking by permitting an almost lateral movement of a motor vehicle into a short parking space. This is accomplished principally by offsetting the steering knuckle with respect to the wheel-supporting spindle; that is to say, instead of placing the steering knuckle, as is common in the prior art, substantially in line with the axis of the wheel spindle, positioning away from said center and parallel to a chord of a circle coinciding with the outer periphery of the wheel hub.

Another important object is, by increasing the permissible range of angular movement of the wheel with respect to the axle of the vehicle, to provide a much shorter turning radius than heretofore, under conventional relative arrangements of the aforementioned elements, has been possible.

Still another object is to compensate for torsional strains of the axle by an arrangement of the spring seat on a side of the axle opposite that of the steering knuckle connection.

The minimization of tire wear by largely eliminating unnecessary alternate turning, first in one direction and then in another, when working into a narrow parking space, is also an object and resultant accomplishment of my present invention.

Other objects and corresponding advantages will be apparent from an examination of the accompanying drawings in the light of the detailed description following.

In said drawings:

Fig. 1 is a plan view, partly in section, of principal parts of my invention, with their pertinent associated elements;

Fig. 2 is an elevation of the assemblage of parts shown in Fig. 1;

Fig. 3 is a section on line 3—3 of Fig. 2.

Fig. 4 is a plan view similar to Fig. 1 showing a modified form of my invention;

Fig. 5 is a reduced sectional view taken on lines 5—5 of Fig. 4, illustrating the disposition of the steering knuckle with respect to the wheel spindle.

Referring to the drawings in detail, the numerals of which designate similar parts throughout the several views, the automobile wheel, including its conventional assemblage of features, not part of the present invention, is indicated generally by the numeral 11. Wheel spindle 12 is rigidly or integrally connected to the circular plate or flange 13, the axis of said spindle forming a right angle with radii of said disc. Steering knuckle 14 is rigidly connected adjacent the rear edge of said disc 13 with its knuckle arm 16 extending from the relatively movable part of said knuckle (not necessary to be further described) in a manner well known in the art, having steering ball 17 adjacent the end thereof.

Axle 15 is attached in the usual manner well known in the art, to the steering knuckle 14. In the embodiment shown in Fig. 4 the axle 15a is offset forwardly so that when the wheel is turned in a direction for straightforward movement, the central portion of said axle, on which the spring is mounted, and the wheel spindle will be substantially in the same vertical plane. Spring seats 18 (Fig. 1) are integral with the axle and extend laterally to the side thereof to which the wheel spindle is disposed, being in substantial alignment with said spindle for the purpose of equalizing strain on the spring. In Fig. 4 spring seat 18a is integrally formed with the axle directly over the longitudinal axis thereof. Springs 20 rest upon their spring seats 18 and 18a, being secured in place by spring clips 19 in the usual manner well known in the art.

Tie rod 21 is secured to the forward edge of disc 13, by a ball and socket joint 22. While in the drawing this tie rod is shown attached at an extension beyond the front edge of the disc 13, it will be obvious that it may be moved backward and attached to the face of the member 13, instead of to the edge as shown, without alteration in principle or mode of operation, and that changes in relative dimensions of parts and precise points of joinder with corresponding elements of the assemblage may be made without departing from the spirit of my invention.

What I claim and desire to secure by Letters Patent is:

1. The combination of a relatively thin disc, a wheel spindle, said wheel spindle being attached to the center of said disc and extending therefrom with its axis perpendicular to the surface of said disc, a steering knuckle rigidly attached to one edge of said disc, the relatively movable part of said steering knuckle being attached to an axle, a tie rod, a universal joint between said disc and said tie rod.

2. In a device of the character described, a metal disc, a wheel spindle, said wheel spindle being attached to the center of said disc and extending therefrom with its axis perpendicular to the surface of said disc, a steering knuckle, an axle, said steering knuckle being operatively connected and interposed between an edge of said disc and an end of said axle, said axle being bent so as to provide a portion which may be placed in substantial alignment with said spindle.

3. In a device of the character described, a metal disc, a wheel spindle, said wheel spindle being attached to the center of said disc and extending therefrom with its axis perpendicular to the surface of said disc, a steering knuckle, an axle, said steering knuckle being operatively connected and interposed between an edge of said disc and an end of said axle, said axle being bent so as to provide a portion which may be placed in substantial alignment with said spindle, a tie rod, a universal joint, said universal joint connecting said tie rod to an edge of said disc.

4. In a device of the character described, a metal disc, a wheel spindle, said wheel spindle being attached to the center of said disc and extending therefrom with its axis perpendicular to the surface of said disc, a steering knuckle, an axle, said steering knuckle being operatively connected and interposed between an edge of said disc and an end of said axle, said axle being bent so as to provide a portion which may be placed in substantial alignment with said spindle, a spring support on said axle substantially in front of an axis through said spindle.

5. The combination of a relatively thin disc, a wheel spindle, said wheel spindle being attached to the center of said disc and extending therefrom with its axis perpendicular to the surface of said disc, a steering knuckle rigidly attached to said disc adjacent one edge thereof, the relatively movable part of said steering knuckle being pivotally connected to an axle, a tie rod, and means to pivotally join said disc and said tie rod.

PAUL F. YUNGLING.